INVENTORS
John L. Harned,
Keith M. Miller, &
Pyati Sudhindranath
BY Paul J. Ethington
ATTORNEY Feb. 1, 1966 J. L. HARNED ET AL 3,232,399
VARIABLE SPEED DRIVE SYSTEM
Filed Oct. 28, 1963 2 Sheets-Sheet 2

INVENTORS
John L. Harned,
Keith M. Miller, &
BY Pyati Sudhindranath
Paul J. Ethington
ATTORNEY 3,232,399
VARIABLE SPEED DRIVE SYSTEM
John L. Harned, Detroit, Keith M. Miller, Utica, and Pyati Sudhindranath, Ann Arbor, Mich., assignors to General Motors Corporation, Detroit, Mich., a corporation of Delaware
Filed Oct. 28, 1963, Ser. No. 319,115
2 Claims. (Cl. 192—103)

This invention relates to a drive system in which the angular velocity of a driven element may be varied with respect to the angular velocity of a driving element and, more particularly, to a mechanical drive system in which speed control is accomplished by varying the ratio of the time during which a disengageable clutch is engaged to the time during which the clutch is disengaged.

A controllable, mechanical drive system for a rotating element is required wherever a constant angular velocity in the driven member is required and the driving element or source is subject to speed variation. Conversely, a controllable system is also required where variable speeds in the driven element are required, and the driving source operates at a single speed. One means suggested in the prior art for accomplishing such a controllable drive connection is to use a variable ratio clutch, such as an eddy current clutch or a magnetic particle clutch. In such a system, speed variations or prevention thereof is accomplished by proportionally energizing the clutch to transmit only that percentage of the potential driving energy which is desired. Under these conditions the output member of the clutch is always rotating at some speed other than that of the input member of the clutch; in other words, the clutch is slipping. Therefore, energy is being lost in the form of heat which decreases the efficiency of the system and may eventually be destructive of the clutch.

The present invention relates to a system by which speed control and variation between the speed of a driving member and a driven member may be accomplished without the undesirable effects of a slipping clutch type of control. Broadly stated, the present invention contemplates a drive system connecting a driven member to a driving member by means of an on-off clutch which is essentially either fully engaged, such that the input and output members thereof are rotating at the same speed, or fully disengaged. In addition, means are provided between the output member of the clutch and the driven element to absorb excess mechanical energy, which is available during the portion of time which the clutch is engaged, and to release this energy to the driven member during the time the clutch is disengaged. In a particular embodiment of the invention, speed control is accomplished in a closed loop system which continually monitors the speed of the driven member with respect to a desired speed and produces control signals which are applied to the clutch in such a manner as to vary the ratio of engaged to disengaged time in the well known pulse duration modulation mode. It will be apparent, however, that open loop control may also be employed in practicing the invention.

The invention may be best understood by referring to the following specification which is to be taken with the accompanying drawings of which:

Figure 1:
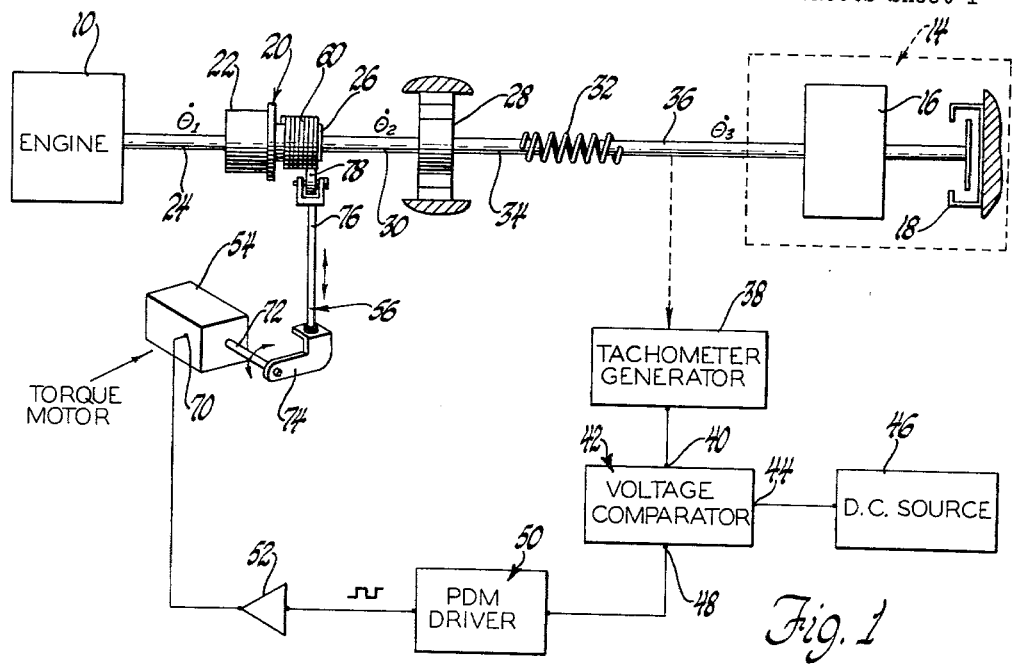
FIGURE 1 is a schematic diagram of a feedback controlled drive system illustrating the present invention.

Referring first to FIGURE 1, the inventive drive system is shown connecting a driving source 10, which may be an internal combustion engine, with a driven load 14. The load may be, for example, an electrical generator 16 requiring reasonably constant input energy for electrical generation. The load may also have an inertial component which resists angular accelerations as schematically indicated at 18. The drive system includes an on-off clutch 20 having an input member 22 connected to the output shaft 24 of the source 10. The clutch also includes an output member 26 connected to a sprag brake 28 by means of a shaft 30. The sprag clutch is connected to an energy storage device 32 by means of shaft 34. The energy storage device is then connected into the load 14 by means of shaft 36.

For purposes of automatically controlling the speed of the load 14, a speed monitoring system may be employed comprising a tachometer generator 38 which is suitably connected to the shaft 36 to generate a D.C. voltage which varies in proportion to the speed of shaft 36. The output of the tachometer generator is connected into a first input 40 of a voltage comparator 42. A second input 44 of the comparator 42 is connected to a selectively variable D.C. voltage source 46. The magnitude of the output of source 46 may be used to present desired speed signals. The signal which is produced by the voltage comparator 42 appears on output 48, which is connected into a control signal generator 50. Generator 50 may consist of a pulse duration modulation driver which produces squarewave pulses having a constant frequency, but which may be varied in width over an individual period. The output of the generator 50 is connected through an amplifier system 52 to the input of a torque motor 54. A mechanical output 56 of the torque motor 54 is connected into the clutch 20 for the purpose of controlling the engagement and disengagement of the clutch 20 as will be more fully described in the following.

As previously stated, a controllable drive system such as prescribed by the present invention may be required wherever it is desirable to regulate the speed of a driven load with respect to a driving source. Such a driving system may be required to obtain speed variations from a constant speed source or to prevent intolerable speed variations due to large variations in the load and/or speed of the driving source. For purposes of discussion it will be assumed that in the embodiment of FIGURE 1, it is desired to drive the load 14 at a substantially constant speed by the engine 10 which is subject to fairly wide speed variations. In the drawing, $\theta_1$ is used to designate the angular velocity of the engine output shaft 24 and, consequently, that of the clutch input member 22. $\theta_2$ denotes the speed of the shafts 30 and 34 and also the speed of the clutch output member 26. $\theta_3$ signifies the speed of the load 14. In accordance with the previous assumptions it is desired that $\theta_3$ be a constant, having a value equal to or less than $\theta_1$.

Describing the system of FIGURE 1 in greater detail, it has been stated that the object of the drive system is to maintain the load 14 at a constant speed irrespective of changes in the output speed of the engine 10. Shaft 24, thus, rotates at $\theta_1$ which is at all times equal to or greater than the desired load speed $\theta_3$. The input member 22 of the on-off clutch 20, thus, rotates at $\theta_1$. When the clutch is engaged, $\theta_2$ equals $\theta_1$ and the drive connection is completed to shaft 36 and the load 14 through the sprag clutch 28 and the energy storage element 32. Since $\theta_2$ is greater than the desired load speed $\theta_3$, the inertial component 18 of the load 14 causes the energy storage element 32, which may be a spring or a torsion tube, to absorb excess energy. The energy is stored by winding up the spring or torsion tube to produce an energy potential. When the clutch 20 is disengaged, $\theta_2$ drops to 0 in a very short time due to the reaction of storage element 32 against the inertia of the load. The energy storage element 32 then reacts against the sprag brake which may be, for example, a Formsprag HPO–400, to unwind, delivering the stored energy to the load 14 which maintains $\theta_3$ at the desired level during the time the clutch is disengaged.

Figure 3:
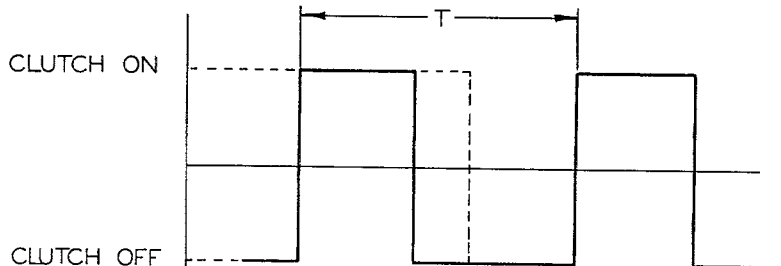
FIGURE 3 is a waveform chart illustrating the possible variations in the clutch-on to clutch-off time ratio.

To maintain fine speed control, the ratio of the clutch engaged time to clutch disengaged time may be modulated by varying the duration of square driving pulses as suggested by the waveform of FIGURE 3. To accomplish this modulation the tachometer generator 38, which may be, for example, a Servo-Tek Incorporated tachometer generator, producing 20.8 volts per thousand r.p.m., is interconnected with shaft 36 to generate a D.C. voltage proportional to $\theta_3$. This D.C. voltage is compared with the D.C. voltage from the source 46 which represents desired speed in the comparator 42. The output signal from the comparator is, thus, proportional to the difference between actual and desired speed and takes the form of a variable amplitude D.C. signal. This D.C. signal is applied to the generator 50 which produces a constant frequency squarewave signal used to energize the torque motor 54. The pulse width of the output of the generator 50 varies in proportion to the amplitude of the D.C. signal from comparator 42. Thus controlled, the torque motor 54 delivers a controlled mechanical input to the clutch 20 which regulates the ratio of the engaged to disengaged time of the clutch 20 in accordance with the waveform of FIGURE 3.

Figure 2:
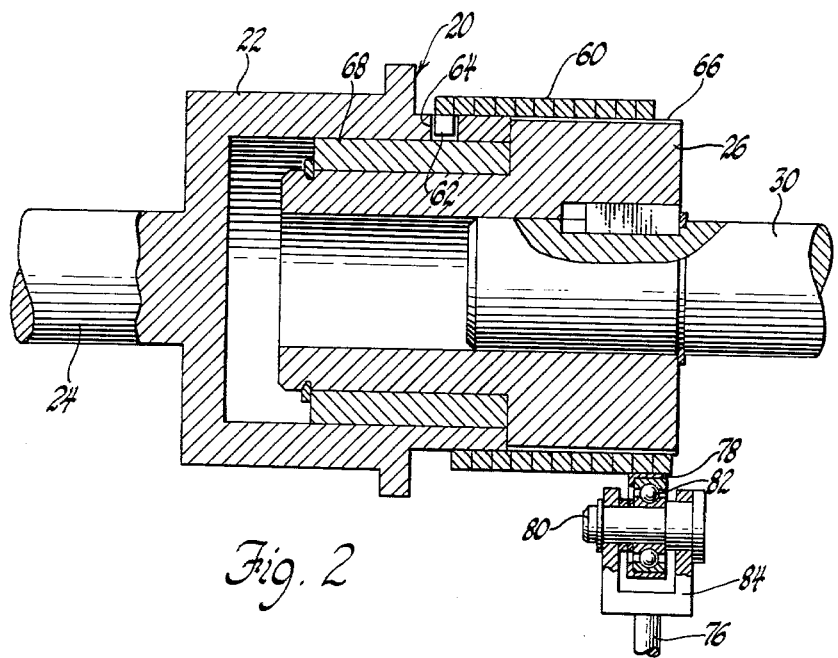
FIGURE 2 is a cross-sectional view of an on-off clutch of a type suitable for use in the present invention.

Details of the clutch 20 and the actuator which is used to control the clutch, are shown in FIGURE 2. In this figure, the on-off clutch 20 is shown as a wrapped spring type clutch such as is available from the Curtiss-Wright Corporation of Cleveland, Ohio, and is identified as Series D, Model No. 467. Briefly described, the Curtiss-Wright clutch 20 includes an input member 22 in the form of a hub which is rigidly connected to the input shaft 24 of FIGURE 1. The input member 22 carries therewith a flat wound spring 60 having a tine 62 which engages a slot 64 in the input hub 22. When the clutch is disengaged, the spring 60 slides over the grooved cylindrical surface 66 of an output hub 26. The output hub 26 is rigidly connected to an output shaft 30. The output hub 26 is journaled within the cylindrical interior of the input hub 22 as indicated at 68 by means of an oilite bearing surface. The normally disengaged clutch may be engaged by applying a very small mechanical force radially to the right-hand end of spring 60 as shown in the figure. This small mechanical force radially depresses the end coils of the spring 60 through approximately $\frac{1}{1000}$ of an inch to engage the grooved surface 66 of the output hub 26. The griping force which is produced by this small contraction of the spring is magnified through the remaining coils of the spring 60 in a regenerative fashion to rapidly bring the output hub 26 up to the same speed as the input hub 22 for torque transmission.

The small mechanical force which is required to engage the clutch 20 is provided by means of the torque motor 54 which is mechanically linked as indicated at 56 with the spring 60. The torque motor 54 may be the Type 212 torque motor which is produced by Elliott Brothers Ltd. of Lewisham, England. The torque motor 54 is responsive to an electrical signal on the input terminal 70 thereof to apply torque to an output shaft 72. The output shaft 72 is mechanically connected by means of a rocker 74 to a shaft 76 which is accordingly reciprocated by action of the torque motor 54. The end of the shaft 76 which is adjacent the spring 60 of the clutch 20 is provided with a small wheel 78 which may be rotated about an axle 80 on a bearing 82. The axle 80 is connected with the shaft 76 by means of a yoke 84. The wheel 78 is adapted to rotatably ride upon the last one or two coils of the spring 60. It is to be understood that the torque motor arrangement of FIGURE 2 is given merely by way of illustration, and that it may, in fact, be desirable to provide the necessary mechanical action by means of electrically operated solenoids or other equivalent mechanism.

As shown in FIGURE 3, the wrapped spring type clutch 20 is responsive to energization of the torque motor 54 to provide substantially instantaneous engagement. The time period T, as indicated in FIGURE 3, may, for example, be on the order of 100 milliseconds. It has been found that the time required for the clutch to go from a disengaged to an engaged state is not more than five milliseconds; that, a substantially square waveform as shown in FIGURE 3 is realized.

Figure 4:
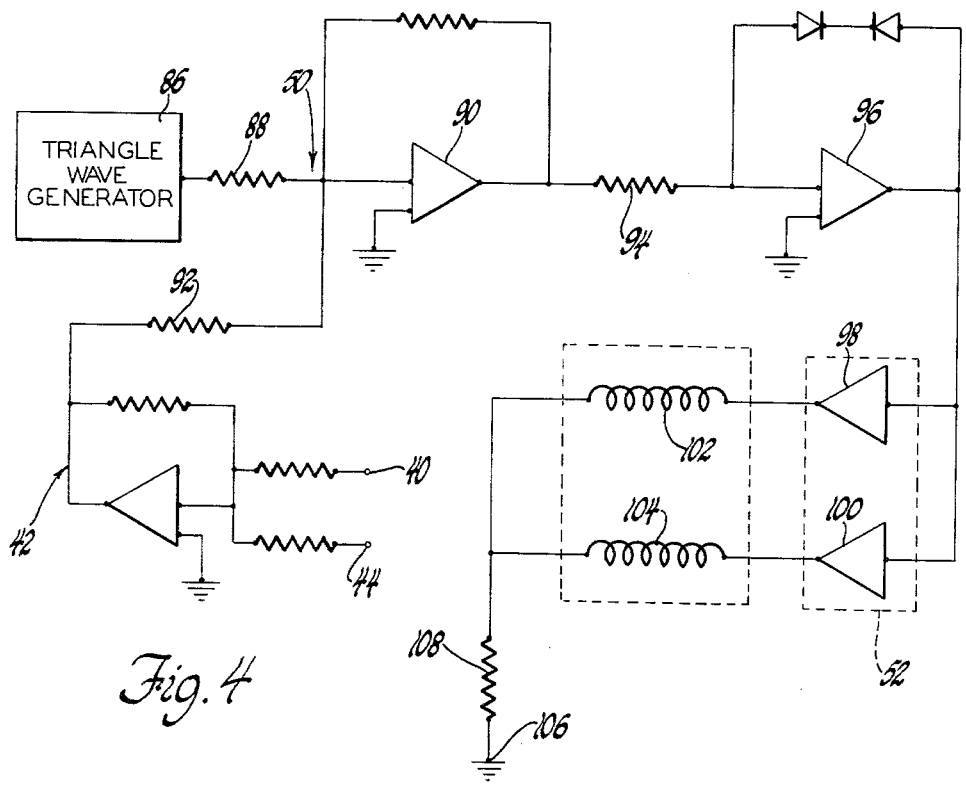
FIGURE 4 is a schematic diagram of an electrical control circuit which may be employed in the illustrative embodiment of FIGURE 1.

Details of the nature of the pulse duration modulator 50 are shown in FIGURE 4. The 100 millisecond basic period may be provided by a triangular wave generator 86 which is connected by means of a resistor 88 to the input of a Philbrick operational amplifier 90. A second input to the amplifier 90 is provided by the voltage comparator 42 which is connected therewith by means of input resistor 92. As indicated, the comparator 42 is provided with two inputs 40 and 44. Input 40 is connected to the tachometer generator 38 of FIGURE 1, and input 44 is connected to the D.C. source 46 of FIGURE 1. The output of the comparator 42 is, thus, a variable amplitude D.C. voltage which is proportional to the difference between the signals on inputs 40 and 44. The output of the Philbrick amplifier 90 is, thus, a constant frequency triangular waveform which rides on a variable level D.C. voltage. This composite signal is applied through a resistor 94 to the input of a second operational amplifier 96 which performs in the nature of a crossing level detector to produce a square output pulse only when the input thereto exceeds a predetermined threshold level. Inasmuch as the triangular waveform from the source 86 rids upon a variable level D.C. signal from the comparator 42, the portion of the triangular waveform which exceeds the threshold level which is built into amplifier 96 will vary in proportion to the magnitude of the D.C. signal. The width-modulated squarewave pulses from amplifier 96 are presented to two Philbrick booster amplifiers 98 and 100 which amplify the pulses for presentation to the two torque motor armature coils 102 and 104 which are connected to ground 106 through a register 108.

It is to be understood that while the present invention has been described with reference to a particular embodiment thereof, the invention is not so limited as various modifications will be apparent to those skilled in the art. For a definition of the invention reference should be had to the appended claims.

What is claimed is:

1. Apparatus for driving a rotatable load at a controlled speed and including: a driving source; clutch means having an input member connected to the source, an output member, and a control member responsive to a control signal quantity to fully engage the input and output members; rotary energy storage means connected between the output member and the load for transmitting a predetermined portion of the energy to the load when the clutch is engaged, the remainder of the energy being stored in the storage means; means to prevent a return flow of the stored energy from the energy storage means to the output member when the clutch is disengaged; sensing means operatively connected to the load for generating first signals proportional to the rate of rotation thereof; means for generating second signals proportional to a desired rate of rotation; means connected to receive the first and second signals and to produce a third signal having a magnitude proportional to the difference between the first and second signals; control means for producing control signals at a predetermined frequency, the control means being connected to receive the third signal and responsive thereto to modulate the duration of the control signals in proportion to variations in the magnitude of the third signal; and means to apply the control signals to the control member to periodically engage the clutch at a predetermined frequency and for durations proportional to the magnitude of the third signal.

2. A controllable drive connection for transmitting rotary energy from a driving source to a driven load, the connection comprising: clutch means having an input member, an output member and a control member, the clutch being normally disengaged but responsive to the application of an input signal to the control member to fully engage the input and output member, the input member being connected to the source; rotary energy storage means connected between the output member and the load and effective to transmit a predetermined portion of the energy from the output member to the load when the clutch is energized and to store the remainder of the energy; means to prevent a return of the stored energy from the energy storage means to the output member when the clutch is disengaged whereby disengagement of the clutch directs said stored energy to the load; a source of control signals operatively connected to the control member for alternately engaging and disengaging the clutch; and modulator means connected to the control signal source for molulating the control signals to vary the ratio of time during which the clutch is engaged to the time during which the clutch is disengaged in a desired manner, the modulator means including means for developing a first signal proportional to load speed; means for developing a second signal proportional to a desired load speed; and means for comparing the first and second signals and producing an error signal proportional to the difference therebetween.

References Cited by the Examiner

UNITED STATES PATENTS

| | | | |
|---|---|---|---|
| 1,208,842 | 12/1916 | Schnuck | 192—40 |
| 1,718,073 | 6/1929 | Reece et al. | 192—103 X |
| 1,861,180 | 5/1932 | Grob. | |
| 2,214,901 | 9/1940 | Griffen | 192—103 X |
| 2,411,122 | 11/1946 | Winther | 192—12.2 X |
| 2,528,316 | 10/1950 | Mayo | 192—104 X |
| 2,788,104 | 4/1957 | Mason | 192—84 |
| 2,806,533 | 9/1957 | Fleck | 192—84 X |

DON A. WAITE, *Primary Examiner.*

DAVID J. WILLIAMOWSKY, *Examiner.*